United States Patent
Komatsu et al.

[15] 3,665,034
[45] May 23, 1972

[54] PROCESS FOR THE PRODUCTION OF CARBOXYLIC ACIDS

[72] Inventors: Youji Komatsu; Takeshi Tamura; Kinya Kujii; Masafumi Hatsutori, all of Chiba, Japan

[73] Assignee: Maruzen Oil Company Limited, Osaka, Japan

[22] Filed: Apr. 25, 1969

[21] Appl. No.: 819,458

[30] Foreign Application Priority Data

Apr. 25, 1968 Japan...................................43/27872
July 20, 1968 Japan...................................43/51473

[52] U.S. Cl........................260/533 A, 260/413, 260/514 C, 260/515 C, 260/526 S, 260/532, 260/535 P, 260/539 R, 260/540
[51] Int. Cl..........................................................C07c 51/14
[58] Field of Search...........................260/533 A, 539 R, 413

[56] References Cited

UNITED STATES PATENTS 3,047,622  7/1962  Kurhajec et al....................260/533 A
2,612,520  9/1952  Doumani et al.....................260/533 A

FOREIGN PATENTS OR APPLICATIONS 1,016,087  1/1966  Great Britain.....................260/533 A Primary Examiner—Lorraine A. Weinberger
Assistant Examiner—Richard D. Kelly
Attorney—Sughrue, Rothwell, Mion, Zinn & Macpeak

[57] ABSTRACT

A process for the production of a carboxylic acid at a high yield with reduced formation of by-products, which comprises reacting an olefin, a halogenated olefin, an alcohol, a halohydrin, an ester, an ether or a mercaptan with carbon monoxide using an acidic catalyst in the presence of a halogenated hydrocarbon and/or a carboxyl group-containing compound and diluting the resulting reaction mixture with water.

22 Claims, No Drawings

PROCESS FOR THE PRODUCTION OF CARBOXYLIC ACIDS

BACKGROUND OF THE INVENTION

1. Field of the Invention

The present invention relates to an improved process for the production of a carboxylic acid from an olefinic feed, carbon monoxide and water at high yields with reduced formation of by-products (the term "olefinic feed" means a compound selected from the group consisting of an olefin, halogenated olefin, alcohol, halohydrin, ester, ether and a mercaptan).

2. Description of the Prior Art

The production of carboxylic acids by the reaction of an olefin having one less carbon atom than that of the desired carboxylic acid with carbon monoxide in the presence of an acidic catalyst under proper reaction conditions followed by the dilution of the resulting reaction mixture with water is well known and described in many patents and literature articles (cf. U.S. Pat. Nos. 2,831,877 and No. 2,876,241). The reaction of this invention involves the so-called "Koch reaction", and some of the typical reactions can be represented by the following reaction schemes:

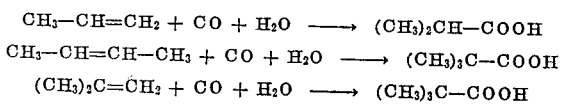

Similar reactions starting from a mono-halogenated olefin, such as methallyl chloride instead of an olefin, may also result in the formation of a mono-halogenated carboxylic acid (cf. U.S. Pat. No. 2,449,163). Starting from an alcohol, an ether or a mercaptan may similarly give a carboxylic acid (cf. U.S. Pat. Nos. 2,913,489 and 2,913,491).

However, in the production of carboxylic acids according to these processes, a large amount of by-products such as polymers and higher acids (i.e., carboxylic acids having a higher molecular weight than that of the desired carboxylic acid) are formed along with the desired carboxylic acids. In particular, when an olefinic feed which has the property of polymerization itself, such as a lower isoolefin, a halogenated olefin, a halohydrin etc., is used as the starting material in these processes, the by-products often amount to about 40–50 percent of the total reaction products. The large formation of by-products is caused by an increase in side reactions such as the dimerization and trimerization of the olefinic feed itself and a decrease of the main reaction between the olefinic feed and carbon monoxide in the presence of an acidic catalyst.

As a consequence of the complexity of the reaction products obtained in these processes and the relatively low content of the desired carboxylic acid therein, the operation of recovering the desired acid therefrom in a relatively pure state is often extremely difficult.

These disadvantages have been serious problems in carrying out the large scale production of carboxylic acids at low cost from an olefinic feed. It is desirable in this art to produce a carboxylic acid from an olefinic feed at a high yield with reduced formation of by-products. Many attempts have been proposed to solve the above problems, for example, by carrying out the reaction in the presence of a small amount of acidic catalyst based on the olefinic feed, carrying out the reaction in the presence of a lower saturated hydrocarbon diluent, such as n-heptane, n-hexane, etc. However, no effective process has yet been proposed, despite extensive and elaborate attempts to solve the above problems.

SUMMARY OF THE INVENTION

In order to overcome the above problems, the inventors have discovered that carboxylic acids can be obtained from an olefinic feed, carbon monoxide and water at a high yield with reduced formation of by-products, by carrying the above-mentioned reaction out in the presence of a halogenated hydrocarbon and/or a carboxyl group-containing compound.

Accordingly, one basic object of the present invention is to provide an improved process for the production of carboxylic acids from olefinic feeds at high yields.

Another object of this invention is to provide a process whereby carboxylic acids can be produced from olefinic feeds at low cost and on a large scale.

A further object of this invention is to provide an improved process for the production of pure carboxylic acids from olefinic feeds with minimum by-product formation.

Yet another object of the present invention is to provide an improved process for the production of carboxylic acids at high yield using a small amount of an acidic catalyst based on the amount of olefinic feed in comparison to the amount of acidic catalyst used in conventional processes.

Still another object of this invention is to provide an improved process for the production of carboxylic acids while effectively suppressing side reactions of the olefinic feed itself, while promoting the main reaction between the olefinic feed and carbon monoxide.

A still further object of this invention is to provide an improved process for the production of carboxylic acids at high yield with reduced formation of by-products from olefinic feeds which easily undergo polymerization.

Other objects and advantages of the present invention will become apparent from the following detailed descriptions.

DETAILED DESCRIPTION OF THE INVENTION

According to the present invention, an olefinic feed is brought into contact with carbon monoxide in the presence of a halogenated hydrocarbon and/or a carboxyl group-containing compound using an acidic catalyst and the resulting reaction mixture is diluted with water, to thereby convert the olefinic feed into a carboxylic acid at a high yield with effective prevention of the formation of by-products as polymers, higher acids, etc.

Moreover, the advantages of the present invention will become remarkably apparent when an easily polymerizable olefinic feed such as a lower isoolefin, a halogenated olefin, a halohydrin, etc. is employed as the starting material.

The olefinic feed used in the process of this invention is any of those known as starting materials in conventional processes.

That is, the olefins used in the present invention can comprise an aliphatic olefin such as ethylene, propylene, n-butylene, iso-butylene and the like, a higher olefin such as diisobutylene, nonene, hexadecene and the like and mixtures thereof. Furthermore, there may also be used cyclic olefins such as cyclopentene, cyclohexene, and 4-vinylcyclohexene-1 and diolefins such as butadiene.

The halogenated olefins used can comprise monohalogenated olefins such as 3-chloro-2-methylpropene, 3-bromo-2-methylpropene, 3-iodo-2-methylpropene, 1-chloro-2-methyl-2-butene, 1-bromo-2-methyl-2-butene, 1-bromo-2,6-dimethyl-2-heptene and the like.

The alcohols used can comprise aliphatic alcohols such as ethanol, n-propanol, iso-propanol, n-butanol, isobutanol, and tert-butanol; higher alcohols such as n-hexanol, sec-hexanol, tert-hexanol, heptanol, and octanol; and mixtures thereof. Furthermore, cyclic alcohols such as cyclopentanol, cyclohexanol, benzyl alcohol and the like may also be employed.

The halohydrins used can comprise 2-monohalogenomethyl-2-propanol, 2-mono-halogenomethyl-2-butanol and the like.

The esters used in the present invention can comprise aliphatic esters such as tert-butyl acetate, tert-butyl pivalate, and the like.

The ethers used can comprise aliphatic ethers such as diethyl ether, di-n-propyl ether, di-isopropyl ether, methyl-tert-butyl ether and the like.

The mercaptans used in the present invention can comprise aliphatic mercaptans such as ethyl mercaptan, propyl mercaptan, n-butyl mercaptan, isobutyl mercaptan, amyl mercaptan, hexyl mercaptan and the like.

The carbon monoxide reactant need not necessarily be pure and may suitably be commercially available carbon monoxide or carbon monoxide-containing gases. The carbon monoxide content in commercially available carbon monoxide or carbon monoxide-containing gases is preferably more than about 40 volume percent in operation. Less than 40 volume percent will proceed in the reaction, though it takes many hours and therefore is not industrially preferred. It is preferred to use excess amounts of carbon dioxide, i.e., more than an equal molar amount based on the olefinic feed, for example, 1 to 20 moles per mole of olefinic feed.

The acidic catalysts used in the process of the present invention are those known as catalysts for Koch reactions, that is, typically sulfuric acid, phosphoric acid, hydrogen fluoride, fluoboric acid, boron trifluoride, hydrated boron trifluoride and mixtures thereof.

The reaction conditions in the process of the present invention are substantially the same as those in the so-called Koch reaction. That is, the reaction of the olefinic feed with carbon monoxide in the presence of the acid catalyst is carried out under a carbon monoxide partial pressure of 1–300 kg./cm², preferably 1–150 kg./cm², and at a temperature of 0°–150° C., preferably 0°–100° C. Furthermore, the reaction may be executed in batch, semi-continuous, or continuous operation. It is desirable to intimately contact the olefinic feed and carbon monoxide with the acidic catalyst in the process of the present invention.

In addition, it is preferred to employ an operation wherein carbon monoxide is first brought into contact with an acidic catalyst and the olefinic feed is added to the acidic catalyst saturated with said carbon monoxide in the method of the present invention. This is similar to the case of the so-called Koch reaction. On the other hand, in the case of simultaneously reacting the three (olefinic feed, carbon monoxide and acidic catalyst) or in the case of first bringing the olefinic feed into contact with an acidic catalyst and then adding the carbon monoxide, the yields of the desired carboxylic acid decrease as compared with the case of the first described method of operation, and the amounts of by-products increase.

These olefinic feeds are preferably introduced into the reaction system at the rate dependent upon the rate of the addition reaction between the olefinic feed and the carbon monoxide in the presence of an acidic catalyst, that is, it is desirable to supply the olefinic feed so as not to accumulate an excess amount of olefinic feed in the reaction system. Accordingly, the time required for the reaction is not definite. The completion of reaction is determined when absorption of carbon monoxide stops.

In the process of this invention, halogenated hydrocarbons to be used comprise aliphatic hydrocarbons containing one–20 carbon atoms, alicyclic hydrocarbons, aromatic hydrocarbons and their mixtures, each of said hydrocarbons having at least one halogen atom. Among them, however, the following halogenated hydrocarbons are preferred: mono-halides of aliphatic saturated hydrocarbons such as methyl halide (hereinafter the term "halide" means chloride, fluoride, bromide and iodide), ethyl monohalide; propyl monohalide (e.g., 1-chloropropane, 1-fluoropropane, 1-bromopropane, 1-iodopropane, 2-chloropropane, etc.); butyl monohalide (e.g., 1-chlorobutane, 2-chlorobutane, 1-chloro-2-methyl propane, 2-chloro-2-methylpropane, etc.); amyl monohalide (e.g., 1-chloropentane, 2-chloropentane, 1-chloro-2-methylbutane, 3-chloro-2-methylbutane, 4-chloro-2-methylbutane, etc.); hexyl monohalide; heptyl monohalide; octyl monohalide; nonyl monohalide; decyl monohalide; dodecyl monohalide; and the like; dihalides of aliphatic hydrocarbons such as methylene dihalide; ethylene dihalide, ethylidene dihalide, trimethylene dihalide, propylidene dihalide, propylene dihalide, tetramethylene dihalide, butylidene dihalide, butylene dihalide (e.g., 1,2,-dichlorobutane, 2,3-dichlorobutane, etc.); and the like; tri- or polyhalides of aliphatic hydrocarbons such as a haloform, carbon tetrachloride, difluoro-dichloromethane, an ethane trihalide (e.g., 1,1,1-trichloroethane, 1,1,2-trichloroethane, etc.); an ethylene trihalide (e.g., trichloroethylene); an ethane tetrahalide (e.g., 1,1,1,2-tetrachloroethane, 1,1,2,2-tetrachloroethane, etc.); an ethylene tetrahalide (e.g., tetrachloroethane); an ethane pentahalide (e.g., pentachloroethane, 1,1,2-trichloro-1,2-difluoroethane, 1,2-dichloro-1,1,2-trifluoroethane, etc.); an ethane hexahalide (e.g., hexachloroethane, 1,1,2-trichloro-1,2,2-trifluoroethane, 1,1,2,2-tetrachloro-1,2-difluoroethane, etc.); chlorinated paraffins, and the like; monohalides of alicyclic hydrocarbons such as a cyclopentane monohalide, cyclohexane monohalide and the like; monohalides of aromatic hydrocarbons such as a benzene monohalide (e.g., monochlorobenzene, monofluorobenzene, monobromobenzene, monoiodobenzene, etc.); a benzyl halide (e.g., benzyl chloride, benzyl bromide, etc.); toluene monohalide (e.g., o-chlorotoluene, p-chlorotoluene, etc.); xylene monohalide (e.g., 3-chloro-o-xylene, 3-chloro-m-xylene, etc.) and the like; dihalides of aromatic hydrocarbons such as a benzene dihalide (e.g., o-dichlorobenzene, m-dichlorobenzene, 1-chloro-2-fluorobenzene); a benzal halide (e.g., benzal chloride, benzal bromide, etc.); a toluene dihalide (e.g., 2,3-dichlorotoluene, etc.); a xylene dihalide (e.g., 4,5-dichloro-o-xylene), and the like; and tri- or polyhalides of aromatic hydrocarbons such as a benzene trihalide (e.g., benzotrichloride, benzotrifluoride; o-chlorobenzotrifluoride, p-chlorobenzotrifluoride, etc.); a xylene hexahalide (e.g., m-xylene hexafluoride, etc.).

A carboxyl group-containing compound, i.e., carboxylic acids or substituted carboxylic acids to be used comprise a carboxylic acid containing 2-25 carbon atoms, an alkoxycarboxylic acid, a halogenated carboxylic acid, a ketocarboxylic acid, a hydroxycarboxylic acid and their mixtures, having at least one carboxyl group. Among them, the following carboxyl group-containing compounds are preferred: monocarboxylic acids such as acetic acid, propionic acid, butylic acid, iso-butylic acid, valeric acid, isovaleric acid, ethylmethylacetic acid, trimethylacetic acid, caproic acid, iso-caproic acid, enanthic acid, caprylic acid, diethylacetic acid, 2,2,4,4-tetramethyl valeric acid, pelargonic acid, capric acid, methyl-n-propylacetic acid, methyl iso-propyl acetic acid, undecanic acid, methyldecanic acid, lauric acid, stearic acid, cyclobutanecarboxylic acid, cyclopentanecarboxylic acid, cyclohexanecarboxylic acid, naphthenic acid, benzoic acid and the like; alkoxy monocarboxylic acids such as methoxyacetic acid, ethoxyacetic acid, methoxypropionic acid, methoxytrimethylacetic acid, and the like; dicarboxylic acids such as malonic acid, glutanic acid, pimeric acid, and the like; halogenated carboxylic acids such as monochloroacetic acid, monobromoacetic acid, monofluoroacetic acid, dichloroacetic acid, dibromoacetic acid, difluoroacetic acid, trichloroacetic acid, trifluoroacetic acid, monochlorotrimethylacetic acid, monobromotrimethylacetic acid, monofluoro-trimethylacetic acid, dichlorotrimethylacetic acid, dibromotri-methylacetic acid, difluorotrimethylacetic acid, and the like; keto-carboxylic acids such as acetoacetic acid, $\alpha$-acetoxy-propionic acid, $\beta$-acetoxytrimethylacetic acid, and the like; and hydroxycarboxylic acids such as lactic acid, $\alpha$-hydroxy-n-butyric acid, $\alpha$-hydroxy-iso-butylic acid, $\beta$-hydroxytrimethylacetic acid, and the like.

Furthermore, a mixture of the aforesaid halogenated hydrocarbon and the carboxyl group-containing compound can be used in the process of this invention.

In the practice of the present invention, the above-described halogenated hydrocarbon and/or carboxyl group-containing compound can be added to the reaction system initially (prior to the reaction) or can be added intermittently or continuously during the course of the reaction. However, they should be present at least partly in the reaction system (for example, at least 0.0001 percent of the total amount of halogenated hydrocarbon and/or carboxyl group-containing compound used) before the olefinic feed is brought into contact with carbon monoxide. Practically, it is preferred to bring a mixture of the olefinic feed and the halogenated hydrocarbon and/or the carboxyl group-containing compound into contact with an acidic catalyst in an atmosphere of carbon monoxide. In this case, it is desirable to introduce said mixture into the reaction system at a rate that is nearly equal to the rate of the addition reaction between the olefinic feed and carbon monoxide so that the unreacted olefinic feed does not accumulate in the reaction system.

The halogenated hydrocarbon and/or carboxyl group-containing compound can be present in the reaction system in an amount of about 0.01-30 moles, preferably about 0.05-15 moles per mol of the olefinic feed. At an amount less than 0.01 mole, unwanted by-products such as polymers and high acids abruptly form and the yield of the desired acid products is lowered. When the amount of the halogenated hydrocarbon and/or the carboxyl group-containing compound exceeds 30 moles, the yield of the desired acids and the amount of by-products are approximately equal to those obtained in the case of using 0.01-30 moles. Therefore, it is uneconomical to employ the halogenated hydrocarbon and/or the carboxyl group-containing compound in an amount greater than 30 moles.

In a conventional process, the optimum mole ratio of an olefinic feed to an acidic catalyst is less than 0.3. When the ratio is higher than 0.3, the yield of the carboxylic acids suddenly lowers. According to the process of this invention, the yield of the desired carboxylic acids is not abruptly lowered even if the mole ratio of the olefinic feed to the acidic catalyst exceeds about 1.0. A suitable mole ratio of the olefinic feed to the acidic catalyst is from about 0.1 to about 0.8.

In general, when a halogenated hydrocarbon is employed in the process of this invention, the amount of the olefinic feed to the acidic catalyst may be somewhat higher than when the carboxyl group-containing compound is employed. In other words, when the halogenated hydrocarbon is employed, the suitable ratio of the olefinic feed to the catalyst may be less than about 0.8, while when the carboxyl group-containing compound is employed, the ratio may be less than about 0.5.

At this time, the reason why the desired carboxylic acids can be obtained at a high yield with reduced formation of by-products when the halogenated hydrocarbon and/or the carboxyl group-containing compound are present in the reaction system of the conventional Koch reactions is not clear.

However, we, the inventors suppose that these compounds (for example, a halogenated hydrocarbon; $R^1X$) may be solvated with an acyl cation ($R^2CO^+$) during the reaction to form a stable solvated acyl cation ($R^1X \cdot R^2CO^+$). A carbonium cation ($R^{2+}$, $R^2-R^{2+}$ etc.) may not be solvated. The formation of the solvated acyl cation is believed to give rise to the lowering of the activation energy of the reaction between a carbonium cation and carbon monoxide.

According to the above assumption, olefin carbonylation may be promoted and the olefin polymerization or acyl cation decomposition is decreased. Therefore, the desired acids are obtained at high yield with low by-product formation.

After removing the unreacted carbon monoxide, the reaction mixture thus obtained is diluted with water to form the carboxylic acid products as in the case of the so-called conventional Koch reaction. The water may be added to the reaction mixture in an amount ranging, for example, from about equal molar amounts to about 200 times as much as equal molar amounts per mole of carbon monoxide reacted. Greater or lesser amounts of water may, however, be employed within the scope of the invention. Dilution of the reaction mixture with water is preferably carried out without any substantial increase in the temperature of the product.

The desired carboxylic acids produced may usually be separated from the diluted reaction mixture by any conventional means such as, for example, stratification, decantation, crystallization, filtration, distillation, extractive distillation, stripping, solvent extraction, alkali-extraction and the like, or in any combination thereof.

According to the process of the present invention, the desired carboxylic acids can be produced from the olefinic feeds, carbon monoxide and water at high yield without substantial formation of by-products. The relatively pure carboxylic acids can be separated by conventional means such as distillation and the like. Accordingly, complicated and uneconomical purification procedures for separating pure carboxylic acids from the reaction products are not required.

As heretofore described in detail, the present invention enables the large scale production of carboxylic acids at low cost.

In particular, the process of this invention can be applied most effectively to the production of carboxylic acids at high yield with reduced formation of by-products using a self-polymerizing olefin such as a lower iso-olefin a halogenated olefin, a halohydrin, etc. as the starting material, or, for the case of using sulfuric acid having a comparatively low concentration, for example about 80 percent, as the catalyst.

The carboxylic acids thus obtained have many uses in a variety of fields such as raw materials for the production of many chemicals and in medicines. The production of $\beta$ - lactone is one of the most useful applications thereof. Since the various uses for carboxylic acids are so well known, no further explanation need be offered.

The following examples further illustrate, but do not limit, the present invention:

EXAMPLE 1

After charging 5 moles (576 g.) of an aqueous solution of 85 percent by weight sulfuric acid to a one liter stainless steel autoclave equipped with an electromagnetic agitator, carbon monoxide was introduced to the autoclave while stirring vigorously at 30° C. until the pressure of carbon monoxide in the autoclave reached 50 kg./cm.$^2$, whereby the sulfuric acid was saturated with the carbon monoxide. Then, a mixture of 1.5 moles (84 g.) of isobutylene and 1.5 moles (184 g.) of monochlorobenzene was introduced into the autoclave over a three hour period. After the introduction of said mixture, the reaction further continued for 30 minutes at 30° C. under 50 kg./cm.$^2$, with stirring.

At the completion of reaction, the carbon monoxide in the autoclave was evacuated and the resulting reaction mixture was poured into 200 ml. of ice-cooled water under vigorous stirring, whereupon two layers separated. The upper oily layer was separated from the lower aqueous layer. The aqueous layer was brought into contact with pentane to extract the desired acid. The oily layer and the pentane extract were combined, washed with water and dried over anhydrous sodium sulfate.

After the separation of pentane and chlorobenzene by evaporation, 149 g. of crude trimethyl acetic acid was obtained.

The purity of the crude trimethyl acetic acid thus obtained was determined to be 96.3 percent by a gas chromatographic analysis as described by H. Miyake et al; Anal. Chem. 40, 113, (1968). The yield of pure trimethyl acetic acid based on the iso-butylene feed was 93.6 mole percent. In addition to trimethylacetic acid, 5.8 g. of neo-nonanic acid was obtained. No formation of high-boiling higher acids and polymers (usually very difficult to separate by distillation) was noted.

COMPARATIVE EXAMPLE 1

The same procedure as in Example 1 was repeated with isobutylene alone instead of a mixture of iso-butylene and monochlorobenzene. The yield of trimethylacetic acid was 60.1 mole percent, and a large amount of unwanted higher acids and polymers which could not be separated by distillation was formed as by-products.

EXAMPLES 2–39 AND COMPARATIVE EXAMPLES 2–8

The same procedure as in Example 1 was repeated employing various olefinic feeds, acidic catalysts, halogenated hydrocarbons and carboxyl group-containing compounds under the same reaction conditions as described in Example 1. Details of these experiments and the results obtained are shown in Table 1 and Table 2.

the presence of a halogenated hydrocarbon having from one to 20 carbon atoms selected from the group consisting of halides of aromatic and saturated hydrocarbons

TABLE 1 (EXAMPLES)

| Example | Olefinic feed | Halogenated hydrocarbon or carboxyl group-containing compound | Acidic catalyst | Product | Yield of carboxylic acids, moles |
|---|---|---|---|---|---|
| 1 | Isobutylene | Monochlorobenzene | 85% H₂SO₄ | Trimethylacetic acid | 93.6 |
| 2 | do | Monobromobenzene | 85% H₂SO₄ | do | 91.7 |
| 3 | do | Benzylchloride | 85% H₂SO₄ | do | 79.6 |
| 4 | do | p-Chlorotoluene | 85% H₂SO₄ | do | 88.9 |
| 5 | do | o-Dichlorotoluene | 85% H₂SO₄ | do | 87.6 |
| 6 | do | 1,2,4-trichlorobenzene | 85% H₂SO₄ | do | 91.6 |
| 7 | do | Benzotrifluoride | 85% H₂SO₄ | do | 93.6 |
| 8 | do | p-Chlorobenzotrifluoride | 85% H₂SO₄ | do | 85.9 |
| 9 | do | m-Xylenehexafluoride | 85% H₂SO₄ | do | 85.4 |
| 10 | do | 1-chlorobutane | 85% H₂SO₄ | do | 93.9 |
| 11 | do | 1-bromobutane | 85% H₂SO₄ | do | 92.6 |
| 12 | do | 1-iodobutane | 85% H₂SO₄ | do | 90.7 |
| 13 | do | 2-chloro-2-methylpropane | 85% H₂SO₄ | do | 91.6 |
| 14 | do | Diisobutylene monochloride | 85% H₂SO₄ | do | 82.7 |
| 15 | do | 1-chloro dodecane | 85% H₂SO₄ | do | 83.6 |
| 16 | do | Methylene chloride | 85% H₂SO₄ | do | 90.6 |
| 17 | do | Ethylene chloride | 85% H₂SO₄ | do | 89.6 |
| 18 | do | Chloroform | 85% H₂SO₄ | do | 90.6 |
| 19 | do | 1,1,1-trichloroethane | 85% H₂SO₄ | do | 90.2 |
| 20 | do | Trichloroethylene | 85% H₂SO₄ | do | 92.9 |
| 21 | do | Carbon tetrachloride | 85% H₂SO₄ | do | 93.0 |
| 22 | do | Tetrachloroethane | 85% H₂SO₄ | do | 85.9 |
| 23ᵃ | do | Trichloroethylene | 80% H₂SO₄ | do | 83.5 |
| 24 | do | do | BF₃·2H₂O | do | 85.6 |
| 25 | do | do | HF | do | 80.2 |
| 26ᵇ | Diisobutylene | Monochlorobenzene | 85% H₂SO₄ | Iso-nonanoic acid | 78.0 |
| 27ᶜ | Methallylchloride | Trichloroethylene | 96% H₂SO₄ | Monochlorotrimethylacetic acid | 56.0 |
| 28 | 2-monochloromethyl-2-propanol | do | 96% H₂SO₄ | do | 57.4 |
| 29 | Tert-butanol | 1,1,2-trichloro-1,2,2-trifluorethane | 96% H₂SO₄ | Trimethylacetic acid | 85.7 |
| 30 | Isobutylene | Monochlorotrimethylacetic acid | BF₃·2H₂O | do | 90.8 |
| 31 | Diisobutylene | Naphthenic acid | 85% H₂SO₄ | do | 82.0 |
| 32ᵈ | Methallylchloride | Monochlorotrimethyl-acetic acid | 96% H₂SO₄ | Monochlorotrimethylacetic acid | 59.1 |
| 33 | Tert-butanol | Acetic acid | 96% H₂SO₄ | Trimethylacetic acid | 88.6 |
| 34 | do | 2,2,4,4-tetramethylvaleric acid | 96% H₂SO₄ | do | 91.3 |
| 35 | do | Monochloroacetic acid | 96% H₂SO₄ | do | 86.2 |
| 36ᵉ | do | β-Hydroxytrimethylacetic acid | 96% H₂SO₄ | do | 88.9 |
| 37 | Isobutylene | Trichloroethylene:trimethylacetic acid (mol ratio 6:1) | 85% H₂SO₄ | do | 92.0 |
| 38 | Tert-butyl pivalate | Trichloroethylene | 85% H₂SP₄ | do | 91.5 |
| 39ᶠ | Tert-butyl acetate | do | HF | do | 91.9 |

ᵃ Isobutylene/trichloroethylene mole ratio=1/2, at 75° C. under 50 kg./cm.².
ᵇ Diisobutylene/H₂SO₄ mole ratio=0.8/1.
ᶜ Methallylchloride/trichloroethylene mole ratio=1/3, at 50° C., under 70 kg./cm.².
ᵈ Methallylchloride/monochlorotrimethylacetic acid mole ratio=1/3; the yield in which the amount of monochlorotrimethylacetic acid added to the reaction system had been omitted.
ᵉ Tert-butanol/β-hydroxytrimethylacetic acid mole ratio=5/1.
ᶠ Tert-butyl acetate/HF mole ratio=1/10.

TABLE 2 (COMPARATIVE EXAMPLES)

| Example | Olefin feed | Halogenated hydrocarbon or carboxyl group-containing compound | Acidic catalyst | Product | Yield of carboxylic acid, mol percent |
|---|---|---|---|---|---|
| 1 | Isobutylene | None | 85% H₂SO₄ | Trimethylacetic acid | 60.1 |
| 2 | do | n-Pentane (diluent) | 85% H₂SO₄ | do | 64.4 |
| 3 | do | Benzene (diluent) | 85% H₂SO₄ | do | 39.5 |
| 4 | do | None | 80% H₂SO₄ | do | 20.5 |
| 5 | Diisobutylene | Benzene (diluent) | 85% H₂SO₄ | Isononanic acid | 68.8 |
| 6 | Methallylchloride | None | 96% H₂SO₄ | Monochlorotrimethyl acetic acid | 2.8 |
| 7 | 2-monochloromethyl-2-propanol | do | 96% H₂SO₄ | do | 21.2 |
| 8 | Tert-butanol | N-heptane (diluent) | 96% H₂SO₄ | Trimethylacetic acid | 65.1 |

To further aid in an understanding of the improvement of the present invention, when said carboxyl group-containing compound is a carboxylic acid per se, a halogenated carboxylic acid, or a hydroxy carboxylic acid, it most preferably has two to 25 carbon atoms. Further, when a halogenated hydrocarbon is used, it generally will have one to 20 carbon atoms and at least one halogen atom. When an aromatic halogenated hydrocarbon is used, it most preferably has six to 20 carbon atoms, and when an aliphatic halogenated hydrocarbon is used, it most preferably has one to 20 carbon atoms.

What is claimed is:

1. In a process for the production of a carboxylic acid comprising:
   reacting an olefin selected from the group consisting of hydrocarbon olefins, mono-halogenated olefins and mixtures thereof, with carbon monoxide in the presence of an inorganic acidic catalyst; and
   diluting the resulting reaction mixture with water; the improvement which comprises conducting said reaction in the presence of a halogenated hydrocarbon having from one to 20 carbon atoms selected from the group consisting of halides of aromatic and saturated hydrocarbons and polyhalides of aliphatic hydrocarbon olefins.

2. The process as claimed in claim 1 wherein said reaction is carried out at a temperature of from 0° C. to 150° C.

3. The process as claimed in claim 1 wherein said reaction is carried out under carbon monoxide partial pressure of from 1 to 300 kg./cm.².

4. The process as claimed in claim 1 wherein the mole ratio of the olefinic feed to the inorganic acidic catalyst varies from about 0.1 to 0.8.

5. The process of claim 1 wherein said inorganic acidic catalyst is selected from the group consisting of sulfuric acid, phosphoric acid, hydrogen fluoride, fluoboric acid, boron trifluoride, hydrated boron trifluoride and mixtures thereof.

6. The process of claim 1 wherein the molar ratio of the carbon monoxide to the olefinic feed varies from about 1 to 20.

7. The process of claim 1 wherein the carbon monoxide is first brought into contact with said inorganic acidic catalyst and then the olefinic feed is added to the inorganic acidic catalyst saturated with the carbon monoxide.

8. The process of claim 1 wherein said halogenated hydrocarbon is selected from the group consisting of monohalides of aliphatic saturated hydrocarbons having from one to 11 carbon atoms, dihalides of aliphatic hydrocarbons having from one to four carbon atoms, tri-, tetra-, penta-, or hexa- halides of aliphatic hydrocarbons having from one to two carbon atoms, chlorinated paraffins, monohalides of alicyclic hydrocarbons, monohalides of benzene, benzyl halide, toluene monohalide or dihalide, xylene monohalide or dihalide, dihalides of benzene, benzal halide and tri-, tetra-, penta- and hexa- halides of benzene.

9. The process of claim 1 wherein the halogenated hydrocarbon is present in the reaction mixture in an amount of at least 0.0001 percent, based on the total amount of halogenated hydrocarbon employed, before the olefinic feed is brought into contact with the carbon monoxide.

10. The process of claim 1 wherein a mixture of the olefinic feed and the halogenated hydrocarbon are brought into contact with the inorganic acidic catalyst in an atmosphere of carbon monoxide.

11. The process of claim 1 wherein the water is added to the resulting reaction mixture in an amount of from about an equimolar amount to the amount of carbon monoxide reacted with the olefinic feed to 200 times said equimolar amount.

12. The process of claim 1 wherein said olefin is a higher olefin.

13. The process of claim 1 wherein said olefin is a cyclic olefin.

14. The process of claim 8 wherein said trihalide of said aliphatic hydrocarbon having from one to two carbon atoms is trichloroethylene.

15. The process of claim 1 wherein said olefin is a diolefin.

16. The process of claim 8 wherein said monohalide of benzene is monochlorobenzene.

17. The process of claim 1 wherein said olefin is an aliphatic olefin.

18. The process of claim 17 wherein said aliphatic olefin is ethylene, propylene, n-butylene or iso-butylene.

19. The process of claim 17 wherein said higher olefin is diisobutylene, nonene or hexadecene.

20. The process of claim 17 wherein said cyclic olefin is cyclopentene, cyclohexene or 4-vinyl cyclohexene-1.

21. The process of claim 15 wherein said diolefin is butadiene.

22. The process of claim 1 wherein said monohalogenated olefin is 3-chloro-2-methyl propene, 3-bromo-2-methyl propene, 3-iodo-2-methyl propene, 1-chloro-2-methyl-2-butene, 1-bromo-2-methyl-2-butene, or 1-bromo-2,6-dimethyl-2-heptene.

* * * * *